United States Patent
Shigemura (10) Patent No.: US 10,857,867 B2
(45) Date of Patent: Dec. 8, 2020

(54) GLASS RUN (71) Applicant: NISHIKAWA RUBBER CO., LTD., Hiroshima (JP)

(72) Inventor: Yasuhiro Shigemura, Hiroshima (JP)

(73) Assignee: NISHIKAWA RUBBER CO., LTD., Hiroshima-ken (JP)

( * ) Notice: Subject to any disclaimer, the term of this patent is extended or adjusted under 35 U.S.C. 154(b) by 111 days.

(21) Appl. No.: 16/212,556

(22) Filed: Dec. 6, 2018

(65) Prior Publication Data
US 2019/0176600 A1 Jun. 13, 2019

(30) Foreign Application Priority Data

Dec. 12, 2017 (JP) ................. 2017-238142

(51) Int. Cl.
| | | |
|---|---|---|
| *E05D 15/16* | (2006.01) |
| *B60J 10/16* | (2016.01) |
| *B60J 10/76* | (2016.01) |
| *C08F 210/16* | (2006.01) |
| *C08J 3/24* | (2006.01) |
| *C08L 23/26* | (2006.01) |

(Continued)

(52) U.S. Cl.
CPC ............... *B60J 10/16* (2016.02); *B60J 10/76* (2016.02); *C08F 210/16* (2013.01); *C08J 3/24* (2013.01); *C08L 23/26* (2013.01); *B60J 10/27* (2016.02); *C08F 2810/00* (2013.01); *C08L 25/10* (2013.01); *C08L 2023/44* (2013.01)

(58) Field of Classification Search
CPC ... B60J 10/17; B60J 10/16; B60J 10/76; B60J 10/27; B60J 10/33; B60J 10/277; C08F 210/16; B29C 35/00; C08L 23/26; C08L 23/0815; C08L 2023/44; C08L 25/10; C08L 91/00; C08L 2205/03; C08L 2312/08; C08L 2810/00
USPC .................................................... 49/440, 441
See application file for complete search history.

(56) References Cited

U.S. PATENT DOCUMENTS 4,969,293 A * 11/1990 Guillon .................... B60J 10/74
                                                 49/441
5,007,202 A * 4/1991 Guillon .................... B60J 10/16
                                               277/644

(Continued)

FOREIGN PATENT DOCUMENTS

| JP | H0264426 U | 5/1990 |
| JP | 2005153817 A | 6/2005 |
| WO | 2016140252 A1 | 9/2016 |

*Primary Examiner* — Jerry E Redman
(74) *Attorney, Agent, or Firm* — Holtz, Holtz & Volek PC (57) ABSTRACT

A glass run for guiding a door glass in a frame includes: a body including an outer-cabin side wall, an inner-cabin side wall, and a connecting wall which connects the side walls and forms a channel; an outer-cabin side lip which extends toward an inside of the channel from the outer-cabin side wall and is slidably brought into contact with an outer-cabin side surface of the door glass; an inner-cabin side lip which extends toward the inside of the channel from the inner-cabin side wall and is slidably brought into contact with an inner-cabin side surface of the door glass. The outer-cabin side lip and the inner-cabin side lip include an ethylene-α-olefin copolymer to which a silane crosslinking is applied. The body includes a thermoplastic resin to which the silane crosslinking is not applied.

15 Claims, 4 Drawing Sheets

(51) Int. Cl.
*C08L 25/10* (2006.01)
*B60J 10/27* (2016.01)

(56) References Cited

U.S. PATENT DOCUMENTS

| | | | | |
|---|---|---|---|---|
| 5,377,449 A | * | 1/1995 | Hineribara | B60J 10/16 428/122 |
| 5,414,961 A | * | 5/1995 | Tessier | B60J 10/16 49/441 |
| 6,301,834 B1 | * | 10/2001 | Tyves | B60J 10/235 49/441 |
| 6,625,931 B2 | * | 9/2003 | Omori | B60J 10/16 49/377 |
| 7,316,097 B2 | * | 1/2008 | Shiraiwa | B60J 10/16 49/441 |
| 7,763,197 B2 | * | 7/2010 | Ellis | B29C 48/30 264/173.17 |
| 8,033,057 B2 | * | 10/2011 | Krause | B60J 10/76 49/441 |
| 8,327,584 B2 | * | 12/2012 | Goto | B60J 10/76 49/441 |
| 10,040,888 B1 | * | 8/2018 | Gopalan | C08F 255/00 |
| 2010/0112366 A1 | * | 5/2010 | Natsuyama | B32B 27/22 428/519 |
| 2010/0222535 A1 | * | 9/2010 | Eaton | C08L 23/06 526/348 |
| 2015/0047264 A1 | * | 2/2015 | Kobayashi | E06B 7/2314 49/440 |
| 2016/0108239 A1 | * | 4/2016 | Cree | C08K 5/5415 428/447 |
| 2017/0137620 A1 | * | 5/2017 | Iwanaga | C08L 33/04 |
| 2017/0349737 A1 | | 12/2017 | Chiba et al. | |
| 2018/0163037 A1 | * | 6/2018 | Gopalan | C08L 23/14 |
| 2019/0176600 A1 | * | 6/2019 | Shigemura | B60J 10/16 |
| 2019/0330456 A1 | * | 10/2019 | Xu | C08K 3/013 |
| 2019/0338109 A1 | * | 11/2019 | Xu | C08L 23/06 |
| 2019/0359805 A1 | * | 11/2019 | Xu | C08L 23/06 |
| 2020/0040177 A1 | * | 2/2020 | Takamori | C08L 51/003 |
| 2020/0123354 A1 | * | 4/2020 | Xu | B60C 1/0016 |
| 2020/0123362 A1 | * | 4/2020 | Xu | C08J 9/142 |

\* cited by examiner

GLASS RUN

CROSS REFERENCE TO RELATED APPLICATION

This application claims the benefit under 35 USC § 119 of JP Patent Application JP 2017-238142 filed Dec. 12, 2017, the entire disclosure of which is incorporated herein by reference.

BACKGROUND INFORMATION

The present invention relates to a glass run of an automobile door, for guiding a door glass in a frame.

Figure 7:
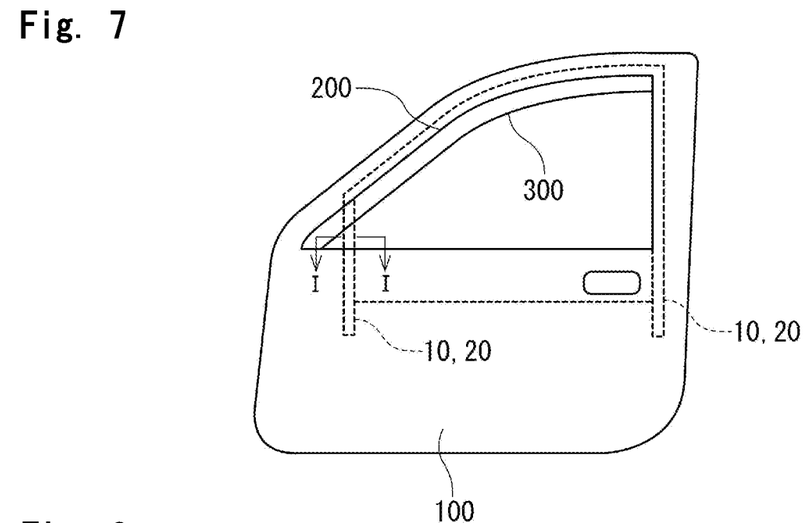
FIG. 7 is an external side view of an automobile door.

As illustrated in FIG. 7, an ordinary glass run 10 of an automobile door 100 has been fit on a frame 200, for guiding a door glass 300 in the frame 200.

Figure 8:
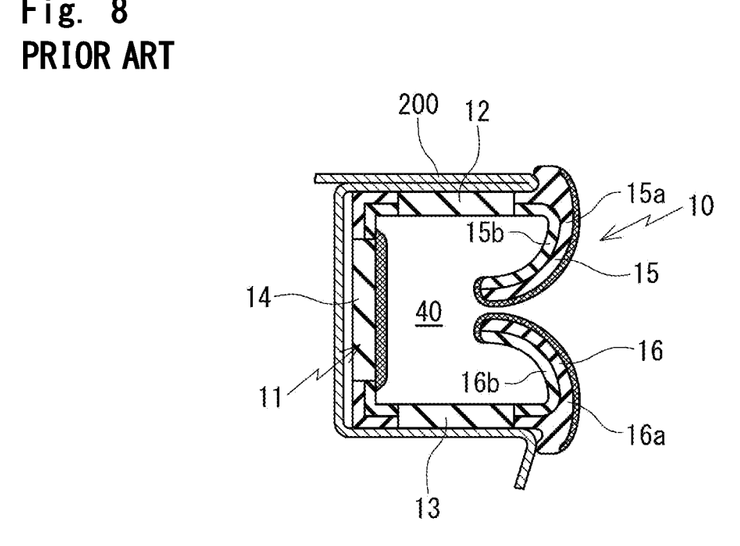
FIG. 8 is an enlarged cross-sectional view of a glass run according to a prior art taken along line I-I of FIG. 7.

As illustrated in FIG. 8, the glass run 10 includes: a body 11 including an outer-cabin side wall 12, an inner-cabin side wall 13 and a connecting wall 14 which connects the side walls 12, 13 and forms a channel 40; an outer lip 15 which extends toward an interior of an automobile from an end part of the outer-cabin side wall 12 and is slidably brought into contact with the door glass 300; an inner lip 16 which extends toward an exterior of the automobile from an end part of the inner-cabin side wall 13 and is slidably brought into contact with the door glass 300 (see, for example, Japanese Unexamined Patent Application Publication No. 2005-153817).

The glass run 10 may include thermoplastic elastomer (TPE) in consideration of weight reduction, recycling, and simplification of operations for thermoplastic elastomer (TPE) does not necessitate vulcanization.

Unfortunately, however, thermoplastic elastomer (TPE) is inferior to vulcanized rubber in a compression set. More specifically, the outer lip 15 and the inner lip 16, which include thermoplastic elastomer (TPE), deform after years of use, and badly bend as compared with an early stage of use. With this configuration, the outer lip 15 and the inner lip 16 are not capable of holding the door glass 300 sufficiently, and allow the door glass 300 to sway widely in an inner-cabin and outer-cabin direction. As a result, when driving the automobile with the door glass 300 slightly open, the door glass 300 oscillates in a width direction of the automobile and causes rattle noise.

In this connection, as illustrated in FIG. 8, Japanese Unexamined Patent Application Publication No. 2005-153817 discloses the outer lip 15 and the inner lip 16, which include two layers in a thickness direction, respectively, (outer layers 15a, 16a, and inner layers 15b, 16b). The inner layers 15b, 16b include material excellent in the compression set.

In addition, Japanese Unexamined Utility Model Application Publication No. 02-064426 discloses a lip which, as a whole, includes material excellent in the compression set.

The lips of Japanese Unexamined Patent Application Publication No. 2005-153817 and Japanese Unexamined Utility Model Application Publication No. 02-064426 are modified in deformation after years of use. But since the lips include thermoplastic elastomer (TPE), the lips are insufficient in heat resistance and scratch resistance.

Accordingly, the lips 15, 16 under a high temperature are decreased in rigidity to hold the door glass 300 from the inner-cabin and outer-cabin side, and allow the door glass 300 to sway widely in the inner-cabin and outer-cabin direction. Also, the lips 15, 16 are easily damaged within a range that is visible to eyes (external part in FIG. 8) during an assembly operation of the glass run 10 on the automobile body or after the assembly operation.

In this connection, WO 2016/140252 discloses a specific silane crosslinking method applied to an EP rubber in which a diene content is reduced, in producing a crosslinked rubber molded body using an ethylene-α-olefin rubber.

According to WO 2016/140252, this configuration eliminates a need for vulcanization facilities for the EP rubber, and produces a silane crosslinked rubber molded body that has an excellent appearance as well as a small high-temperature compression set and ozone resistance.

Unfortunately, however, since inorganic filler included in the silane crosslinked rubber molded body of WO 2016/140252 increases specific gravity of the silane crosslinked rubber molded body, the weight of the glass run is not reduced.

Also, WO 2016/140252 indicates that the invention is applicable to glass run channels [paragraph 0007] but does not provide any further explanation.

Therefore, an object of the present invention is to provide the glass runs excellent in the heat resistance and scratch resistance, and reduced in weight.

SUMMARY

In order to achieve the above-mentioned object, according to one aspect of the invention, a glass run (20) of an automobile door (100) is provided, for guiding a door glass (300) in a frame (200). The glass run (20) includes a body (21), an outer-cabin side lip (25), and an inner-cabin side lip (26).

The body (21) includes an outer-cabin side wall (22), an inner-cabin side wall (23), and a connecting wall (24) which connects the side walls and forms a channel (40).

The outer-cabin side lip (25) extends toward an inside of the channel (40) from the outer-cabin side wall (22) and is slidably brought into contact with an outer-cabin side surface of the door glass (300).

The inner-cabin side lip (26) extends toward the inside of the channel (40) from the inner-cabin side wall (23) and is slidably brought into contact with an inner-cabin side surface of the door glass (300).

The outer-cabin side lip (25) and the inner-cabin side lip (26) include an ethylene-α-olefin copolymer to which a silane crosslinking is applied.

The body (21) includes a thermoplastic resin to which the silane crosslinking is not applied.

In addition, according to an aspect of the present invention, the inorganic filler is not incorporated designedly in the ethylene-α-olefin copolymer to which the silane crosslinking is applied for use as the outer-cabin side lip (25) and the inner-cabin side lip (26).

In addition, according to an aspect of the present invention, an α-olefin in the ethylene-α-olefin copolymer has carbon atoms that fall within a range of 3 to 10.

In addition, according to an aspect of the present invention, the ethylene-α-olefin copolymer includes at least one of an ethylene-butene copolymer, an ethylene-hexene copolymer, and an ethylene-octene copolymer.

In addition, according to an aspect of the present invention, a stylene-butadiene copolymerized resin (SBC) is incorporated in the ethylene-α-olefin copolymer to which the silane crosslinking is applied.

Symbols in parentheses show constituents or items corresponding to the drawings.

According to the present invention, the outer-cabin side lip and the inner-cabin side lip of the glass run include the ethylene-α-olefin copolymer to which the silane crosslinking is applied. This configuration enables production of the lips of the glass run, which have the small compression set and which are excellent in the heat resistance and scratch resistance by ordinary facilities for molding thermoplastic resin by extrusion, not by vulcanization facilities with high temperature reactors.

In addition, the body of the glass run includes the thermoplastic resin to which the silane crosslinking is not applied. This configuration keeps straightness of the body while being stored after the molding by extrusion and cooling until the next step. More specifically, in case the silane crosslinking is applied to the body, the body may warp unintentionally while being stored or carried. This is conceivably because, once the silane crosslinking is applied to the body, the moisture of the air promotes the crosslinking even after the molding. But, since the silane crosslinking is not applied to the body, the body does not warp. Since the body of the glass run is required to be smooth in accordance with the smooth automobile body, it is preferable not to apply the silane crosslinking, which may cause warping, to the body. In addition, the body, which is assembled on the automobile body, has a complicated shape, and necessitates transformability (profile extrusion) during the molding by extrusion. In this connection, the ordinary thermoplastic resin (TPE, PP, PE, for example) to which the silane crosslinking is not applied is easy to mold.

In addition, the inorganic filler is not incorporated designedly in the ethylene-α-olefin copolymer to which the silane crosslinking is applied for use as the outer-cabin side lip and the inner-cabin side lip. This configuration allows the lips to have a specific gravity of not more than 0.9 and does not increase weight of the glass run.

The lips without the inorganic filler are inferior in strength and rigidity. But, with the configuration that the α-olefin in the ethylene-α-olefin copolymer has carbon atoms that fall within the range of 3 to 10, the silane crosslinking generates favorable strength of the lips. The ethylene-α-olefin copolymer preferably includes at least one of the ethylene-butene copolymer, the ethylene-hexene copolymer, and the ethylene-octene copolymer, and may include one or a mixture of at least two of these copolymers.

In addition, the stylene-butadiene copolymerized resin (SBC) is incorporated in the ethylene-α-olefin copolymer to which the silane crosslinking is applied. This configuration improves the transformability during the molding by extrusion and simplifies the molding of the lips into desired shapes by extrusion. More specifically, it is difficult to add oil directly to the ethylene-α-olefin copolymer and adjust the transformability. But it is possible to add a large amount of oil to the stylene-butadiene copolymerized resin (SBC). Accordingly, incorporating the stylene-butadiene copolymerized resin (SBC) in the ethylene-α-olefin copolymer improves the transformability of a resin composition as a whole.

DETAILED DESCRIPTION

Referring to the drawings, a glass run 20 according to an embodiment of the present invention will be described. It is to be noted that the following detailed description are exemplary and explanatory only and are not restrictive of the invention as claimed, application, or use.

Figure 1:
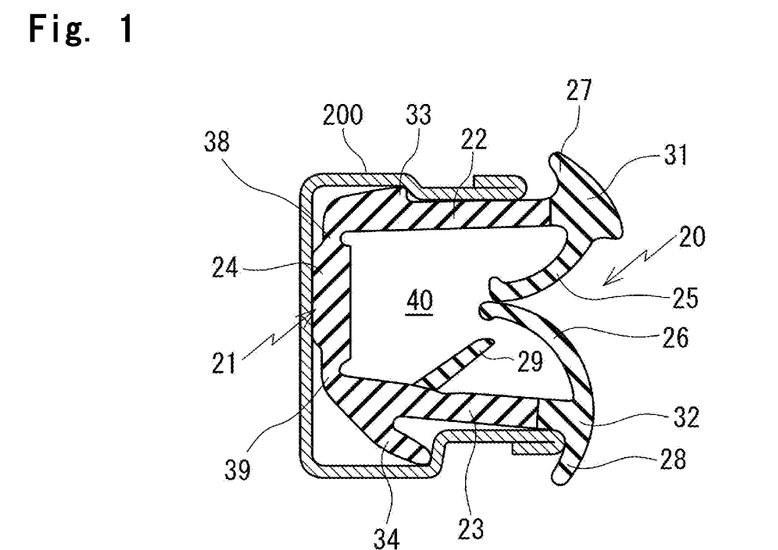
FIG. 1 is an enlarged cross-sectional view of a glass run according to an embodiment of the present invention taken along line I-I of FIG. 7.

Referring to FIG. 1, the glass run 20 according to the embodiment of the present invention will be described.

The glass run 20 according to the embodiment of the present invention is formed by molding by extrusion. The glass run 20 of an automobile door 100 illustrated in FIG. 7 guides a door glass 300 in a frame 200. The glass run 20 mainly includes: a body 21, which forms a channel 40, an outer lip (outer-cabin side lip) 25, an inner lip (inner-cabin side lip) 26, and a sub lip 29. The glass run 20 extends upward from an inner part of a door panel and crosses over a belt line vertically. In the present embodiment, the glass run 20 is applied to a vertical edge part of the frame 200 on a front part of an automobile body.

The body 21 has a substantially U-shaped cross section including an outer-cabin side wall 22, an inner-cabin side wall 23, and a connecting wall 24 which connects the side walls and forms the channel 40.

The outer lip 25 diagonally extends toward an interior of an automobile and the connecting wall 24 from an inner-cabin side surface of an outer support 31. The outer support 31 is integrally molded with an end of the outer-cabin side wall 22.

Opposite the outer lip 25, the inner lip 26 diagonally extends toward an exterior of the automobile and the connecting wall 24 from an outer-cabin side surface of an inner support 32. The inner support 32 is integrally molded with an end of the inner-cabin side wall 23.

Figure 2:
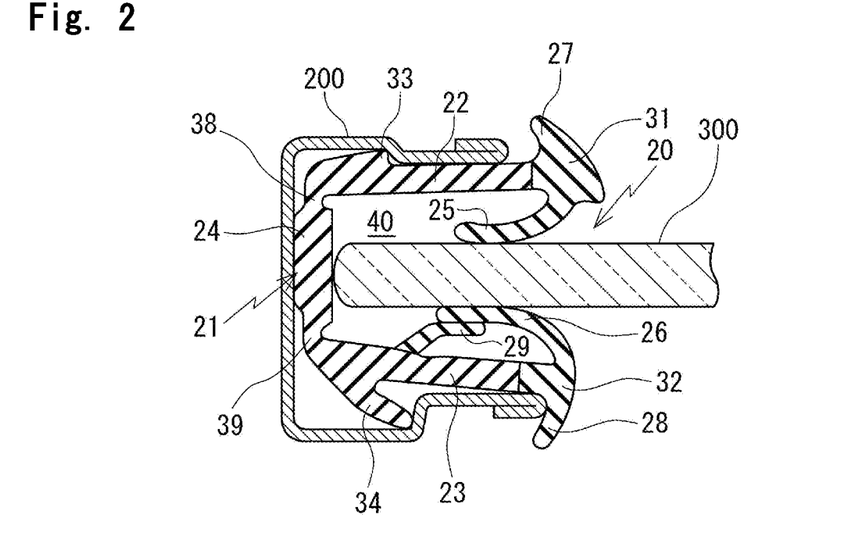
FIG. 2 is the enlarged cross-sectional view of the glass run taken along line I-I of FIG. 7, illustrated in FIG. 1, with a door glass in a closed position.

As illustrated in FIG. 2, when the door glass 300 is in a closed position, the sub lip 29 approaches an inner side (inner-cabin side) of the inner lip 26 and supports a top end of the inner lip 26.

A decorative lip 27 diagonally extends toward the exterior of the automobile from an outer-cabin side surface of the outer support 31. A decorative lip 28 diagonally extends toward the interior of the automobile from an inner-cabin side surface of the inner support 32.

An anchoring lip 33 extends from an outer-cabin side of the outer-cabin side wall 22 and is close to the connecting wall 24. An anchoring lip 34 extends from an inner-cabin side of the inner-cabin side wall 23 and is close to the connecting wall 24. Bent parts of the frame 200 catch the anchoring lips 33, 34 such that the glass run 20 once fit on the frame 200 does not easily come off the frame 200.

Figure 4:
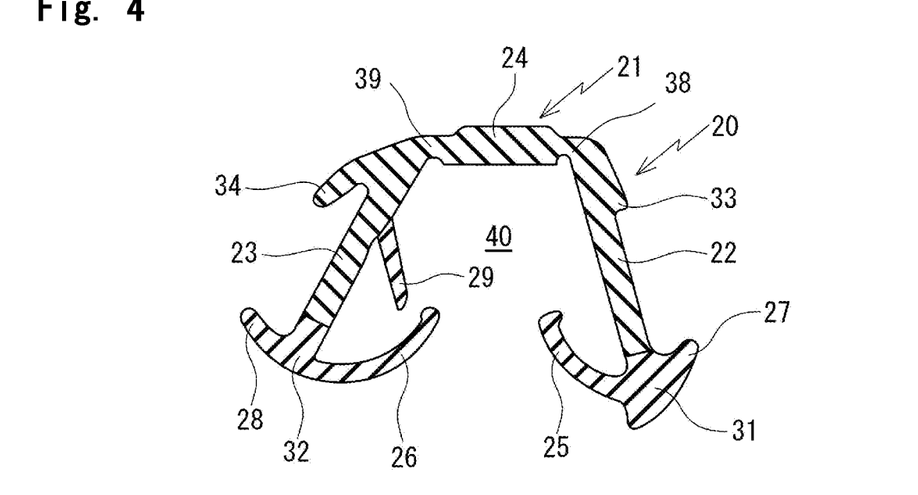
FIG. 4 is a cross-sectional view of the glass run molded by extrusion using a resin extruder in FIG. 3.

An outer-cabin side connecting part 38 connects the outer-cabin side wall 22 and the connecting wall 24. An inner-cabin side connecting part 39 connects the inner-cabin side wall 23 and the connecting wall 24. The outer-cabin side connecting part 38 and the inner-cabin side connecting part 39 are reduced in thickness such that the glass run 20 is bent for assembly on the frame 200 (FIG. 1, for example) from an original shape (FIG. 4) just after the molding by extrusion.

The outer lip 25, the inner lip 26, and the sub lip 29 of the glass run 20 include an ethylene-α-olefin copolymer to which a silane crosslinking is applied. The body 21 of the glass run 20 includes a thermoplastic resin to which the silane crosslinking is not applied.

More specifically, the glass run 20 includes: first members which include the ethylene-α-olefin copolymer to which the silane crosslinking is applied; and second members which include the thermoplastic resin to which the silane crosslinking is not applied. The first members of the glass run 20 include: the outer lip 25; the outer support 31, which supports the outer lip 25; the decorative lip 27, which extends from the outer support 31; the inner lip 26; the inner support 32, which supports the inner lip 26; the decorative lip 28, which extends from the inner support 32; and the sub lip 29. The remaining members of the glass run 20 other than the first members are the second members.

An α-olefin in the ethylene-α-olefin copolymer to which the silane crosslinking is applied preferably has carbon atoms that fall within a range of 3 to 10. The ethylene-α-olefin copolymer preferably includes at least one of an ethylene-butene copolymer, an ethylene-hexene copolymer, and an ethylene-octene copolymer, and may include one or a mixture (blend) of at least two of these copolymers. A stylene-butadiene copolymerized resin (SBC) is incorporated in the ethylene-α-olefin copolymer to which the silane crosslinking is applied. The SBC has a process oil incorporated therein.

The inorganic filler is not incorporated designedly in ethylene-α-olefin copolymer to which the silane crosslinking is applied for use as the outer lip 25, the inner lip 26, and the sub lip 29.

Examples of the inorganic filler include: boron nitride, silica (crystalline silica, amorphous silica, or the like), carbon black, clay, zinc oxide, tin oxide, titanium oxide, molybdenum oxide, antimony trioxide, a silicone compound, quartz, talc, zinc borate, white carbon, zinc hydroxystannate, and zinc stannate.

Examples of the inorganic filler also include hydration water and metal hydrates such as a compound having a hydroxy group or crystallized water.

Examples of the metal hydrate include metal hydroxides such as aluminum hydroxide, magnesium hydroxide and aluminum oxide hydrate, further, calcium carbonate, magnesium carbonate, calcium silicate, magnesium silicate, calcium oxide, magnesium oxide, aluminum oxide, aluminum nitride, aluminum borate whisker, and also inorganic salts or inorganic oxides having hydration water and the like such as hydrated aluminum silicate, hydrated magnesium silicate, basic magnesium carbonate, and hydrotalcite.

Examples of the inorganic filler also include minerals and processed products.

The body 21 and the anchoring lips 33, 34 as the second members of the glass run 20 include the thermoplastic resin to which the silane crosslinking is not applied such as thermoplastic elastomer (TPE), polypropylene (PP), polyethylene (PE), or a mixture of at least two of these. In other words, the body 21 and the anchoring lips 33, 34 are the second members of the glass run 20 other than the first members which include the ethylene-α-olefin copolymer to which the silane crosslinking is applied.

In the present embodiment, the thermoplastic resin to which the silane crosslinking is not applied is olefinic the thermoplastic elastomer (TPO).

Figure 3:
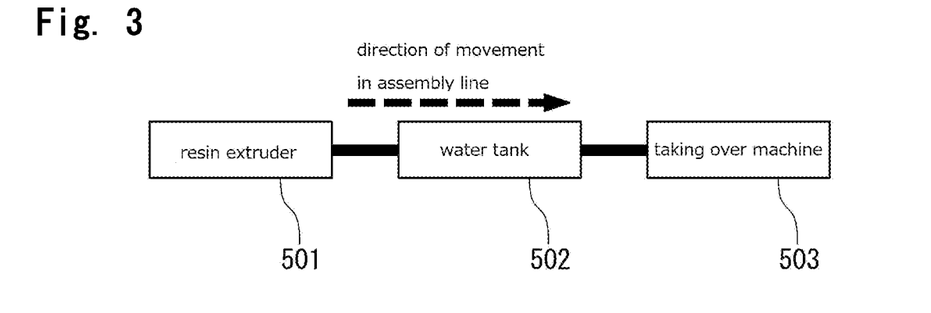
FIG. 3 is a block diagram of manufacturing processes of the glass run illustrated in FIG. 1.

The glass run 20 is manufactured in manufacturing processes illustrated in FIG. 3.

Specifically, the glass run 20 is subjected to a continuous molding by extrusion in the following manner. First, a resin extruder 501 extrudes the glass run 20 uniformed into a desired shape by a nozzle under an appropriate temperature. The glass run 20 just after the extrusion has a cross section illustrated in FIG. 4 that the sub lip 29 turns downward, and the lips 25, 26, or 29 do not come into contact with each other. Secondly, the glass run 20 after the extrusion is soaked in water in a water tank 502 (cooling tank) for cooling. Thirdly, a taking over machine 503 at the back of the water tank 502 stretches the glass run 20.

Water in the water tank 502 and the moisture of the air promotes the silane crosslinking applied to the lips 25, 26, and 29. The lips 25, 26, and 29 are advanced in the crosslinking at least on the surface, such that the lips 25, 26, and 29 are excellent in scratch resistance at least on the surface. The ethylene-α-olefin copolymer to which the silane crosslinking is applied is also suitable for use as the outer support 31, the decorative lip 27 which extends from the outer support 31, the inner support 32, and the decorative lip 28 which extends from the inner support 32.

According to the embodiment of the present invention, the outer lip 25 as the outer-cabin side lip, the inner lip 26 as the inner-cabin side lip, and the sub lip 29 of the glass run 20 include the ethylene-α-olefin copolymer to which silane crosslinking is applied. This configuration enables production of the lips of the glass run 20, which have the small compression set and which are excellent in the heat resistance and scratch resistance, by ordinary facilities for molding thermoplastic resin by extrusion, not by vulcanization facilities with high temperature reactors. This configuration prevents: the door glass 300 from swaying widely in an inner-cabin and outer-cabin direction under the high temperature; the outer lip 25 and the inner lip 26, which support the door glass 300, from deforming remarkably after years of use; and the door glass 300, which is slightly open, from oscillating in a width direction of the automobile and causing rattle noise when driving the automobile.

In addition, the body 21 of the glass run 20 includes the thermoplastic resin to which the silane crosslinking is not applied. This configuration keeps straightness of the body 21 while being stored after the molding by extrusion and cooling until the next step or while being carried to a site of assembly on the automobile body. More specifically, in case the silane crosslinking is applied to the body, the body may warp unintentionally while being stored. This is conceivably because, once the silane crosslinking is applied to the body 21, the moisture of the air promotes the crosslinking even after the molding. But, since the silane crosslinking is not applied to the body 21, the body 21 does not warp. Since the body 21 of the glass run 20 is required to be smooth in accordance with the smooth automobile body, it is preferable not to apply the silane crosslinking, which may cause warping, to the body 21. In addition, the body 21, especially the outer-cabin side connecting part 38 and the inner-cabin side connecting part 39 of the body 21, which is assembled on the automobile body, necessitates an adjustment of the thickness depending on designs. Sine the adjustment of the thickness is precise and complicated, the body 21 necessitates transformability during the molding by extrusion. In this connection, the ordinary thermoplastic resin (TPE, PP, PE, for example) to which the silane crosslinking is not applied performs the excellent transformability and is easy to mold.

In addition, the inorganic filler is not incorporated designedly in the ethylene-α-olefin copolymer to which the silane crosslinking is applied for use as the lips 25, 26, 29. The absence of the inorganic filler in the lips 25, 26, 29 keeps a specific gravity of the lips 25, 26, 29 not more than 0.9 and does not increase weight of the glass run 20.

The lips 25, 26, 29 without the inorganic filler are inferior in strength and rigidity. But, with the configuration that the ethylene-α-olefin copolymer is one of the ethylene-butene copolymer, the ethylene-hexene copolymer, the ethylene-octene copolymer, and a mixture of at least two of these copolymers, the silane crosslinking generates favorable strength of the lips 25, 26, 29.

In the present embodiment, the stylene-butadiene copolymerized resin (SBC) is incorporated in the ethylene-octene copolymer as the ethylene-α-olefin copolymer. The stylene-butadiene copolymerized resin (SBC) includes process oil. The resultant material has the hardness in a range of 60 to 80 measured with JIS K 6253 of Japanese Industrial Standards (JIS), durometer type A.

In addition, the stylene-butadiene copolymerized resin (SBC) is incorporated in the ethylene-α-olefin copolymer to which the silane crosslinking is applied. This configuration improves the transformability during the molding by extrusion and simplifies the molding of the lips 25, 26, 29 into desired shapes by extrusion. More specifically, it is difficult to add oil directly to the ethylene-α-olefin copolymer and adjust the transformability. But it is possible to add a large amount of oil to the stylene-butadiene copolymerized resin (SBC). Accordingly, incorporating the stylene-butadiene copolymerized resin (SBC) in the ethylene-α-olefin copolymer improves the transformability of a resin composition as a whole.

In this embodiment, the outer lip 25, the outer support 31 which supports the outer lip 25, the decorative lip 27 which extends from the outer support 31, the inner lip 26, the inner support 32 which supports the inner lip 26, the decorative lip 28 which extends from the inner support 32, and the sub lip 29 as the first members include the ethylene-α-olefin copolymer to which the silane crosslinking is applied. The second members of the glass run 20 other than the first members include the thermoplastic resin to which the silane crosslinking is not applied. But, this should not be construed in a limiting sense.

Another possible embodiment is that, the glass run 20 does not include the sub lip 29 as illustrated in FIG. 1.

Another possible embodiment is that, the glass run 20 includes an outer-cabin side lip and an inner-cabin side lip as extra members, and the extra members include the ethylene-α-olefin copolymer to which the silane crosslinking is applied.

Figure 5:
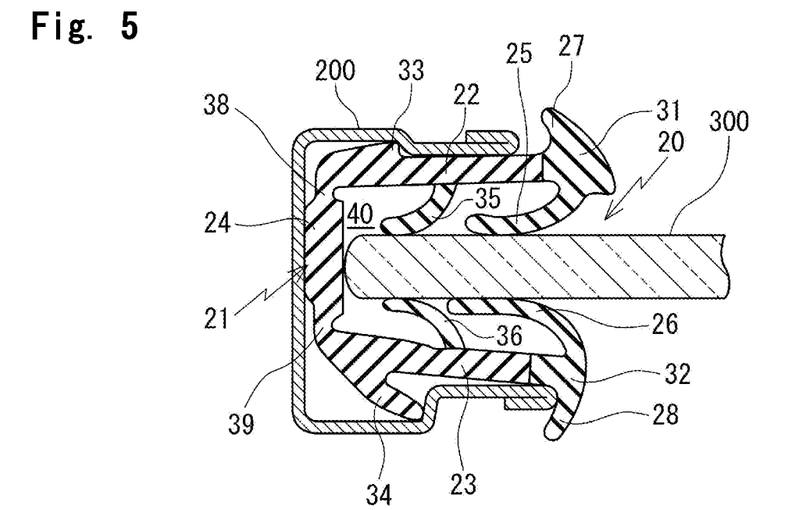
FIG. 5 is an enlarged cross-sectional view of another glass run according to an embodiment of the present invention taken along line I-I of FIG. 7 with the door glass in the closed position.

More specifically, an outer-cabin sub lip 35 and an inner-cabin sub lip 36, as illustrated in FIG. 5, may include the ethylene-α-olefin copolymer to which the silane crosslinking is applied. The outer-cabin sub lip 35 is on the outer-cabin side wall 22 and is closer to the connecting wall 24 than the outer lip 25. The inner-cabin sub lip 36 is on the inner-cabin side wall 23 and is closer to the connecting wall 24 than the inner lip 26.

Figure 6:
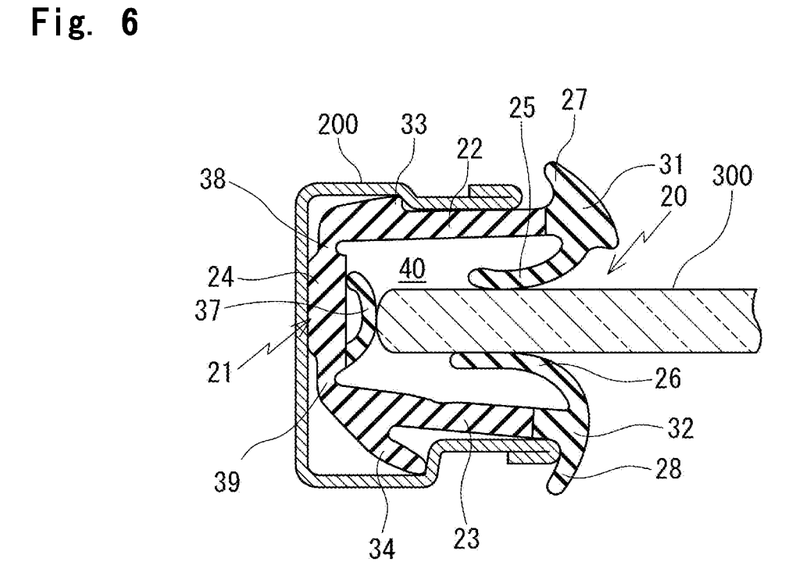
FIG. 6 is an enlarged cross-sectional view of still another glass run according to an embodiment of the present invention taken along line I-I of FIG. 7 with the door glass in the closed position.

Another possible embodiment is that, a seal lip 37, as illustrated in FIG. 6, includes the ethylene-α-olefin copolymer to which the silane crosslinking is applied. The seal lip 37 extends from an inner side of the connecting wall 24 and makes elastic contact with an end of the door glass 300.

Having described the invention as related to the present embodiments, the invention should not be limited by any of the details of the description, unless otherwise specified, but rather be construed broadly within its spirit and scope as set out in the accompanying claims.

I claim:

1. A glass run for an automobile door, for guiding a door glass in a frame, the glass run comprising:
   a body including an outer-cabin side wall, an inner-cabin side wall, and a connecting wall which connects the side walls and forms a channel, the body including a thermoplastic resin to which a silane crosslinking is not applied;
   an outer-cabin side lip which extends toward an inside of the channel from the outer-cabin side wall and is configured to be slidably brought into contact with an outer-cabin side surface of the door glass; and
   an inner-cabin side lip which extends toward the inside of the channel from the inner-cabin side wall and is configured to be slidably brought into contact with an inner-cabin side surface of the door glass,
   wherein the outer-cabin side lip and the inner-cabin side lip include an ethylene-α-olefin copolymer to which the silane crosslinking is applied, the ethylene-α-olefin copolymer to which the silane crosslinking is applied not having an inorganic filler incorporated therein.

2. The glass run as claimed in claim 1, wherein in the ethylene-α-olefin copolymer, the α-olefin has 3 to 10 carbon atoms.

3. The glass run as claimed in claim 2, wherein the ethylene-α-olefin copolymer is one of an ethylene-butene copolymer, an ethylene-hexene copolymer, an ethylene-octene copolymer, and a mixture of at least two of the copolymers.

4. The glass run as claimed in claim 3, wherein the ethylene-α-olefin copolymer to which the silane crosslinking is applied has a stylene-butadiene copolymerized resin (SBC) incorporated therein.

5. The glass run as claimed in claim 1, wherein the ethylene-α-olefin copolymer is one of an ethylene-butene copolymer, an ethylene-hexene copolymer, an ethylene-octene copolymer, and a mixture of at least two of the copolymers.

6. The glass run as claimed in claim 2, wherein the ethylene-α-olefin copolymer to which the silane crosslinking is applied has a stylene-butadiene copolymerized resin (SBC) incorporated therein.

7. The glass run as claimed in claim 5, wherein the ethylene-α-olefin copolymer to which the silane crosslinking is applied has a stylene-butadiene copolymerized resin (SBC) incorporated therein.

8. The glass run as claimed in claim 1, wherein the ethylene-α-olefin copolymer to which the silane crosslinking is applied has a stylene-butadiene copolymerized resin (SBC) incorporated therein.

9. A glass run for an automobile door, for guiding a door glass in a frame, the glass run comprising:
   a body including an outer-cabin side wall, an inner-cabin side wall, and a connecting wall which connects the side walls and forms a channel, the body including a thermoplastic resin to which a silane crosslinking is not applied;
   an outer-cabin side lip which extends toward an inside of the channel from the outer-cabin side wall and is configured to be slidably brought into contact with an outer-cabin side surface of the door glass; and an inner-cabin side lip which extends toward the inside of the channel from the inner-cabin side wall and is configured to be slidably brought into contact with an inner-cabin side surface of the door glass, wherein the outer-cabin side lip and the inner-cabin side lip include an ethylene-α-olefin copolymer to which the silane crosslinking is applied, and wherein in the ethylene-α-olefin copolymer, the α-olefin has 3 to 10 carbon atoms.

10. The glass run as claimed in claim 9, wherein the ethylene-α-olefin copolymer is one of an ethylene-butene copolymer, an ethylene-hexene copolymer, an ethylene-octene copolymer, and a mixture of at least two of the copolymers.

11. The glass run as claimed in claim 10, wherein the ethylene-α-olefin copolymer to which the silane crosslinking is applied has a stylene-butadiene copolymerized resin (SBC) incorporated therein.

12. The glass run as claimed in claim 9, wherein the ethylene-α-olefin copolymer to which the silane crosslinking is applied has a stylene-butadiene copolymerized resin (SBC) incorporated therein.

13. A glass run for an automobile door, for guiding a door glass in a frame, the glass run comprising:
a body including an outer-cabin side wall, an inner-cabin side wall, and a connecting wall which connects the side walls and forms a channel, the body including a thermoplastic resin to which a silane crosslinking is not applied;
an outer-cabin side lip which extends toward an inside of the channel from the outer-cabin side wall and is configured to be slidably brought into contact with an outer-cabin side surface of the door glass; and
an inner-cabin side lip which extends toward the inside of the channel from the inner-cabin side wall and is configured to be slidably brought into contact with an inner-cabin side surface of the door glass,
wherein the outer-cabin side lip and the inner-cabin side lip include an ethylene-α-olefin copolymer to which the silane crosslinking is applied, and
wherein the ethylene-α-olefin copolymer is one of an ethylene-butene copolymer, an ethylene-hexene copolymer, an ethylene-octene copolymer, and a mixture of at least two of the copolymers.

14. The glass run as claimed in claim 13, wherein the ethylene-α-olefin copolymer to which the silane crosslinking is applied has a stylene-butadiene copolymerized resin (SBC) incorporated therein.

15. The glass run as claimed in claim 1, A glass run for an automobile door, for guiding a door glass in a frame, the glass run comprising:
a body including an outer-cabin side wall, an inner-cabin side wall, and a connecting wall which connects the side walls and forms a channel, the body including a thermoplastic resin to which a silane crosslinking is not applied;
an outer-cabin side lip which extends toward an inside of the channel from the outer-cabin side wall and is configured to be slidably brought into contact with an outer-cabin side surface of the door glass; and
an inner-cabin side lip which extends toward the inside of the channel from the inner-cabin side wall and is configured to be slidably brought into contact with an inner-cabin side surface of the door glass,
wherein the outer-cabin side lip and the inner-cabin side lip include an ethylene-α-olefin copolymer to which the silane crosslinking is applied, and
wherein the ethylene-α-olefin copolymer to which the silane crosslinking is applied has a stylene-butadiene copolymerized resin (SBC) incorporated therein.

* * * * *

UNITED STATES PATENT AND TRADEMARK OFFICE
CERTIFICATE OF CORRECTION

PATENT NO. : 10,857,867 B2  
APPLICATION NO. : 16/212556  
DATED : December 8, 2020  
INVENTOR(S) : Yasuhiro Shigemura It is certified that error appears in the above-identified patent and that said Letters Patent is hereby corrected as shown below:

In the Specification  
Column 2, Line 61, delete "stylene-butadiene" and insert --styrene-butadiene--.  
Column 3, Line 44, delete "stylene-butadiene" and insert --styrene-butadiene--.  
Column 3, Line 52, delete "stylene-butadiene" and insert --styrene-butadiene--.  
Column 3, Line 53, delete "stylene-butadiene" and insert --styrene-butadiene--.  
Column 5, Line 31, delete "stylene-butadiene" and insert --styrene-butadiene--.  
Column 6, Line 3, after "olefinic" delete "the".  
Column 7, Line 17, delete "stylene-butadiene" and insert --styrene-butadiene--.  
Column 7, Lines 19-20, delete "stylene-butadiene" and insert --styrene-butadiene--.  
Column 7, Line 24, delete "stylene-butadiene" and insert --styrene-butadiene--.  
Column 7, Line 32, delete "stylene-butadiene" and insert --styrene-butadiene--.  
Column 7, Line 33, delete "stylene-butadiene" and insert --styrene-butadiene--.  
Column 8, Line 38, delete "stylene-butadiene" and insert --styrene-butadiene--.  
Column 8, Line 47, delete "stylene-butadiene" and insert --styrene-butadiene--.  
Column 8, Line 51, delete "stylene-butadiene" and insert --styrene-butadiene--.  
Column 8, Line 55, delete "stylene-butadiene" and insert --styrene-butadiene--.  
Column 9, Line 18, delete "stylene-butadiene" and insert --styrene-butadiene--.  
Column 9, Line 22, delete "stylene-butadiene" and insert --styrene-butadiene--.  
Column 10, Line 12, delete "stylene-butadiene" and insert --styrene-butadiene--.

In the Claims  
Column 10, Line 14 (Claim 15, Line 1), before "A" delete "The glass run as claimed in claim 1".  
Column 10, Line 33 (Claim 15, Line 21), delete "stylene-butadiene" and insert --styrene-butadiene--.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*